United States Patent Office 3,368,426
Patented Feb. 13, 1968

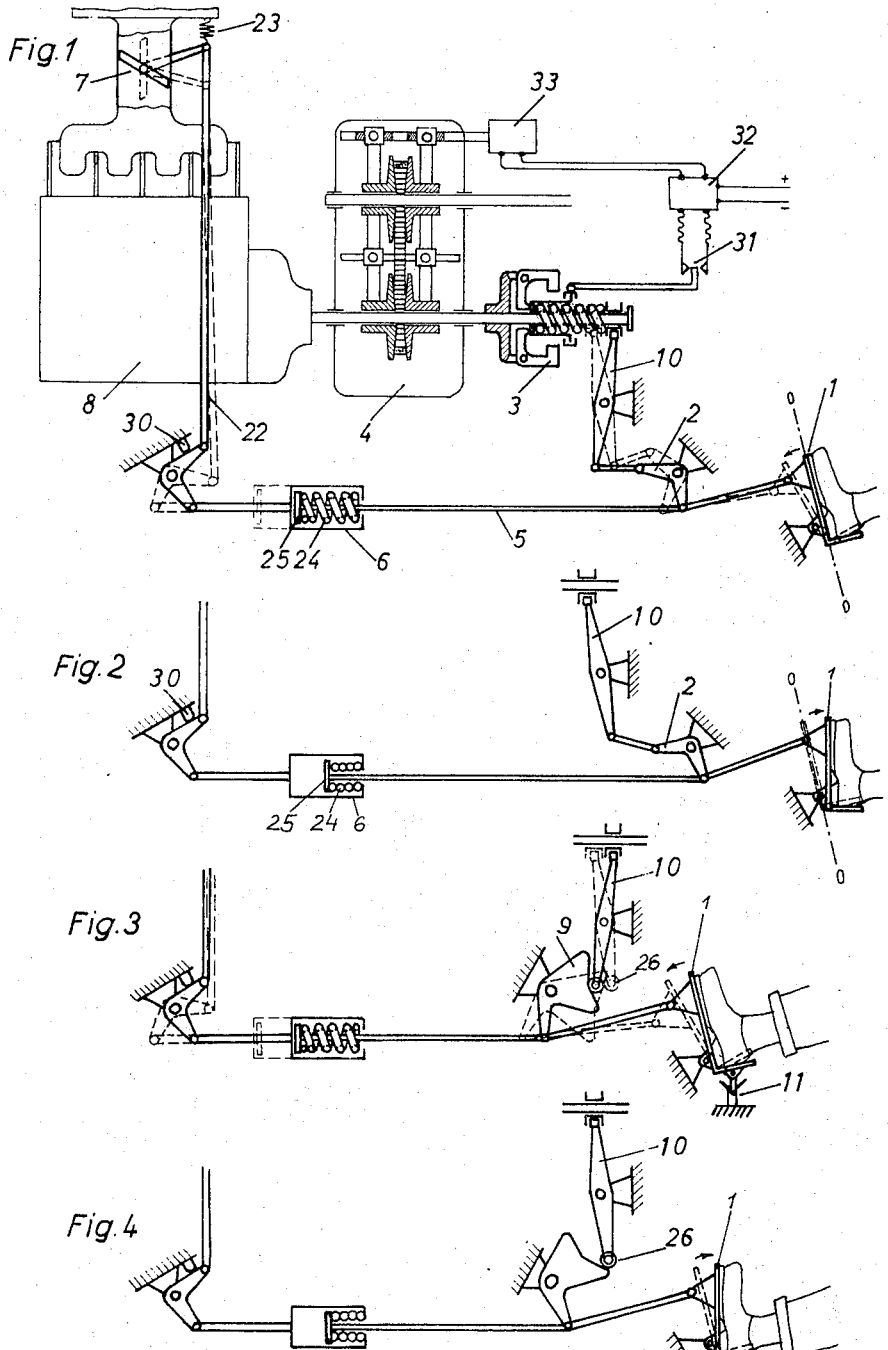

3,368,426
CONTROL MECHANISM FOR ENGINE COMBINED
WITH INFINITELY VARIABLE TRANSMISSION
Erhardt Karig and Herbert Kirchner, Bad Homburg vor
der Hohe, Germany, assignors, by mesne assignments,
to Reimers Getriebe A.G., Zug, Switzerland, a Swiss
firm
Filed Mar. 12, 1965, Ser. No. 439,242
6 Claims. (Cl. 74—865)

ABSTRACT OF THE DISCLOSURE

An engine drives a vehicle through an infinitely variable transmission, the ratio of which can be varied by a speed-responsive governor. A foot pedal is provided which is movable in both directions from an intermediate position. When pushed below this position, the pedal gradually opens the valve of a carburetor feeding the engine and also varies the spring pressure on the governor to control the ratio of the transmission. When allowed to move above this position (in which the carbureter valve is in closed or idling position) the pedal, while leaving the valve closed, continues to operate on the governor in such a way as to increase the speed at which the engine is driven by the wheels so that the engine exerts a braking action on the vehicle which increases as the pedal moves upward.

---

The present invention relates to a control mechanism for a drive unit consisting of an engine which is combined with an infinitely variable transmission for driving and braking a machine, especially a vehicle.

Infinitely variable transmissions of mechanical or hydrostatic types which are connected to engines, especially of vehicles, are generally designed so as to attain the best possible coordination between the driving torque resulting from the fuel supply to the engine and the speed of the engine. This coordination is effected by a power control lever such as an accelerator, the movement of which to different positions determines the amount of the fuel supplied to the engine by means of a throttle valve, a fuel injection pump, or the like, and which is also connected to a governor, for example, a centrifugal governor or a hydraulic fuel control pump, or the like, which is influenced by the speed of the engine and adapted at a prevailing output of the engine to adjust the speed ratio of the infinitely variable transmission so as to be in accordance with the torque which is required at any particular time on the driven shaft of the transmission. The driver of the vehicle therefore only needs to adjust the engine output so as to be of the desired strength, while the adjustment of the speed of the vehicle in relation to the adjusted engine output is carried out by the infinitely variable transmission, the speed ratio of which is adjusted in accordance with the prevailing speed of the vehicle by means of the governor which is influenced by the engine speed.

When employing a drive unit of this type for a vehicle, there are considerable difficulties in decelerating the vehicle by means of the engine, that is, by means of the braking power of the engine resulting from its internal power losses when the power control lever, i.e., the accelerator, is released and the fuel or other energy supply is therefore substantially interrupted. In this position, the infinitely variable transmission is adjusted by the governor to a higher speed ratio so that the engine will then run at the lowest possible speed and will therefore have a low decelerating effect upon the moving vehicle since the braking power of a throttled engine increases in relation with its speed. In a vehicle which is provided with a shift-gear transmission, this may be avoided when driving down a steep grade by shifting the transmission to a lower gear in accordance with a high engine speed or by leaving the transmission in a higher gear or shifting it thereto when the grade is low and the desired deceleration by the engine should therefore also be low. During each of these shifting operations there is, however, always the danger that, since the transmission of power from the propelling driving wheels of the vehicle to the decelerating engine is then interrupted, the vehicle might accelerate excessively and might even get out of the driver's control completely.

It is therefore the object of the present invention to provide a control mechanism for a drive unit consisting of an engine and an infinitely variable transmission which permits the continuous adjustment of the engine speed by means of the infinitely variable transmission to be employed not only for accelerating and decelerating the speed of the vehicle on a level or ascending road, but also for attaining an equally sensitive and continuous variation and control of the decelerating or braking action of the engine when driving the vehicle downhill. The control mechanism according to the invention should therefore be capable, even when the driver decelerates the vehicle by means of the engine by substantially shutting off the fuel supply, to transmit to the governor the driver's command for a certain engine speed and thus also for the particular deceleration or braking effect as may then be desired so that this govenor, in turn, will act upon the infinitely variable transmission and change the speed ratio thereof and will thereby attain the desired engine speed independently of the prevailing driving speed of the vehicle.

Another object of the invention is to attain the above mentioned results without requiring any additional control means which have to be actuated by the driver for giving the mentioned command other than those control means which are usually provided in a motor vehicle.

For attaining these objects the present invention originally relies upon a control mechanism of a conventional type for a drive unit consisting of a combination of an engine the speed of which depends upon the load thereon, with an infinitely variable transmission of any type which is suitable for driving as well as decelerating any machine, but especially a vehicle, by means of the same control elements which are usually provided for this purpose, and more particularly by means of at least one power control lever such as an accelerator, the movement of which to different positions determines the amount of fuel which is supplied to the engine, and which is also connected to a governor which is influenced by the speed of the engine and adapted to adjust the speed ratio of the infinitely variable transmission so as to be in accordance with the torque which is required at any particular time on the driven shaft of the transmission. On this basis, it is the principal feature of the present invention for attaining the above-mentioned objects to provide a control mechanism which, when the fuel supply to the engine is substantially shut off, may be operated by the driver by means of a control element which is adapted to regulate the braking power of the engine by solely acting upon the governor which is influenced by the engine speed and which by such an adjustment of this control element independently of the driving speed of the vehicle and thus independently of the speed of the driven shaft of the transmission permits the speed of the engine while driven by the vehicle, and thereby also the braking power of the engine, to be adjusted to any desired value. The invention therefore permits the power control lever, for example the accelerator of a car, to be shifted continuously without manipulation of any other control element from any particular driving position to any desired decelerating or braking posiiton thereof without danger that any interruption in the power transmission may occur during the shifting operation.

Another feature of the invention consists in designing the control mechanism so that the same power control lever will also serve for regulating the braking power of the engine by being also movable within a range in which it acts solely upon the governor which is influenced or controlled by the speed of the engine, and which extends from the neutral position of this lever in the direction opposite to its driving range, i.e., the range within which an accelerator was solely movable prior to this invention.

The power control lever of the new control mechanism is therefore pivotable forwardly for controlling the normal driving operation, while by pivoting it toward the rear of its neutral position a braking action is exerted upon the vehicle which results from the interior power losses of the engine. When this control lever is being pivoted forwardly, this movement is positively transmitted by means of a suitable one-way coupling and connecting rods to the fuel control element of the engine so as to open the same, and at the same time this movement is transmitted by a lever system to the governor which is thereby adjusted so as to change the speed ratio of the infinitely variable transmission. Both of these operations together result in an increase in driving power since the adjustment of the governor which controls the speed ratio of the transmission results during the forward movement of the power control lever in an increase in the balanced speed of the engine and a corresponding increase in the speed of the vehicle. The fuel supply and the speed of the engine may be coordinated with each other in any suitable manner by conventional means, for example, so as to attain the lowest possible specific fuel consumption.

The connection between this governor and the control motor for adjusting the transmission may be effected, for example, by a reversing switch in combination with a contactor, although this may also be accomplished by other transmitting means which may be, for example, of a hydraulic type.

The one-way coupling which connects the power control lever to the fuel control element is designed so as to transmit the movements of this lever forwardly of its neutral position positively to the fuel control element, but to take up or absorb any movements of the power control lever toward the rear of its neutral position. This neutral position of the power control lever corresponds to the closed position of the fuel control element and is determined in a conventional manner by a stop which limits the reverse movement of the connecting elements between the control lever and the fuel control element by the action of a spring which is connected to the engine. Therefore, when the power control lever is moved toward the rear of its neutral position, the fuel control element remains in its neutral position and shuts off the fuel supply to the engine since, as already mentioned, this rearward movement of the power control lever is taken up by the one-way coupling.

This rearward movement of the power control lever may, however, be continued beyond its neutral position, and it then controls the governor in the same manner as it does while the vehicle is driven by the engine, so that the governor, in turn, acts upon the infinitely variable transmission so as to adjust the speed of the engine to the desired value.

By means of the control mechanism according to the invention it is therefore possible to adjust the transmission during a downhill drive just as sensitively and continuously as during a level or uphill drive with the only difference that during the downhill drive the fuel control element is closed and a command for reducing the speed of the driven shaft of the transmission results in an increase in the speed of the engine and thus in an increase in the braking power which is produced by the engine. It is therefore possible without any additional control elements other than those normally provided in a motor vehicle also to drive safely along long and changing downhill slopes by employing the braking action of the engine in accordance with the gradient of these slopes. The control mechanism according to the invention and the operation thereof as above described saves the wheel brakes of the vehicle very considerably and also facilitates and improves the driver's control of the vehicle, increases its driving safety and road-worthiness, and constitutes a very valuable technical improvement not only over vehicles with shift-gear transmissions, but also over those with infinitely variable transmissions with standard control means as employed prior to this invention.

Another feature of the invention consists in connecting the power control lever by means of a bell crank to the governor which is influenced by the speed of the engine. Such a construction has the advantage that the point of reversal between the driving and braking operations, that is, the neutral position of the power control lever, may be accurately fixed and that a continuous power transmission may be attained from any desired driving position of this lever to any desired braking position thereof without requiring the driver to operate any other control element.

Another feature of the invention consists in connecting the power control lever to the governor which controls the speed ratio of the transmission by means of a cam plate upon which a transmitting lever engages. The use of such a cam plate in place of a lever system including a bell crank for controlling the governor in the manner as above described has the advantage that the coordination of the engine output with the speed of the engine which normally does not follow a rectilinear law may in this manner be effected in an extremely simple manner. The use of such a cam plate has the further advantage that the point of reverse between the driving and braking operations which must coincide with the neutral position of the power control lever may thereby be fixed without any difficulties.

A further feature of the invention consists in the provision of a device for automatically arresting the power control lever in any braking position to which it has been moved. Such a device has the advantage that the driver of a vehicle, after he has pivoted the power control lever to any desired braking position thereof, may remove his foot from this control lever so as to enable him to step on the normal brake pedal to apply the wheel brakes without affecting the continued action of the engine brake.

Futher important features of the invention consist in the provision of an exhaust brake for increasing the braking power of the engine, in providing suitable means for coupling the control member for regulating the braking power of the engine, that is, either a separate control member or the accelerator, to such an exhaust brake, and also in providing means for carrying out such a coupling operation selectively and at any desired position of the respective control member while the engine is being driven by the vehicle.

Although the combination of an engine brake with an exhaust brake results in an increase in braking power, this advantage is attainable only at the cost of a highly increased noise level. In order to prevent the annoying noise of the exhaust brake at least from occurring at all times during the braking operation of the power control lever, the invention provides that the exhaust brake may be operated together with the engine brake either only at will by an additional control function of the driver or automatically only when the control lever for the actuation of the engine brake has already been moved for a considerable distance.

Another feature of the invention consists in modifying the control mechanism by connecting the power control lever, on the one hand, to the governor which is controlled by the speed of the engine and, on the other hand, by means of an intermediate lever to the fuel control element which determines the amount of fuel which is supplied to the engine, and by providing further means which, by the additional actuation of the brake pedal for the wheel brakes of the vehicle, permit the support of the bearing of the intermediate lever to be acted upon in such a manner that the effect upon the fuel control element caused by the actuation of the power control lever will be partly or entirely eliminated. An additional feature of the invention which is of advantage particularly when applied to a vehicle, the engine of which is equipped with an automatic clutch, consists in providing the intermediate lever in the form of a balance beam and in pivotably mounting this lever on one end of another two-armed lever which is pivotable about a central axis and the other end of which rests on a clamp-shaped support which is connected to a piston which is slidable within a hydraulic cylinder, and is thus movable longitudinally, that is, in a direction substantially at a right angle to the direction of the two-armed lever when the latter is not pivoted from its normal position, and in controlling the position of this piston by the actuation of the brake pedal of the hydraulic wheel-brake mechanism.

This last-mentioned embodiment of the invention has the advantage that the adjustment of the power control lever and thus also of the governor for changing the speed ratio of the transmission while the vehicle is driven by the engine, that is, while it is supplied with fuel, and also the corresponding adjustment while the vehicle is decelerated by the engine and the fuel supply is shut off are both carried out in the same direction. When the brake pedal for the hydraulically controlled wheel brakes is then slightly depressed, the piston is lifted in the hydraulic cylinder which is connected to the hydraulic brake line. This has the result that the position of the clamp-shaped member on which one end of the intermediate two-armed lever is supported is shifted upwardly while the other end of this lever on which the balance beam is mounted drops down so that the fuel control element is closed and any subsequent forward movement of the power control lever only acts upon the governor of the transmission. The actual operation of the wheel brakes does not occur until the brake pedal is therefore further depressed. In this manner it is possible to effect the strongest possible braking action by the engine and also an application of the wheel brakes at the same time. Also this embodiment of the invention permits the engine brake to be associated with an exhaust brake. A very important advantage of this control mechanism also consists in the fact that, since the fuel control element is always closed before the wheel brakes can be applied, this mechanism is foolproof insofar as it is impossible for the driver to make any errors in its operation which might damage the engine or any other parts and which prior to this invention could occur if the power control lever, i.e., the accelerator, and the brake pedal were depressed at the same time. It is therefore now perfectly permissible that the driver rests both feet on the foot pedals of a car, that is, his right foot on the accelerator and the left foot on the brake pedal, since this cannot lead to any damage. On the contrary, this has the advantage that, since the driver saves the time which he would otherwise need for shifting his right foot from the accelerator to the brake pedal, he can apply the wheel brakes more quickly and can thus also reduce the stopping distance of the vehicle considerably which, in turn, means that a vehicle which is equipped with such a control mechanism has a higher road safety than other vehicles with conventional control means. If, however, a driver does not wish to apply the engine brake, he may also operate this control mechanism without any disadvantages in the conventional manner by actuating the accelerator and brake pedal successively with the same foot.

A control mechanism of this design has the further advantage that it enables the driver to operate the car contrary to the normal association between the speed and torque as determined by the power control lever by employing his right foot for controlling the speed ratio of the transmission and his left foot for controlling the engine output. This is of particular importance in passing maneuvers when the driven shaft must have a high moment of acceleration. By depressing his right foot, the driver may race the engine before the passing maneuver, while holding the fuel control element nearly closed with his left foot by stepping lightly on the brake pedal. As soon as the passing maneuver may be safely carried out, the driver only needs to remove his left foot from the brake pedal and will then have the full engine power available for accelerating the vehicle.

Another advantageous feature of the invention consists in supporting the mentioned balance beam by means of a bracing lever which is pivotable to a limited extent, and in connecting this bracing lever by connecting rods and a one-way coupling to the brake pedal for the operation of the wheel brakes.

Such a mechanism permits the balance beam which forms the connection between the power control lever and the fuel control element to be deprived of its central support and this support to be adjusted continuously up to an end position in which an actuation of the power control lever will only result in an adjustment of the governor for changing the speed ratio of the transmission, but not in an actuation of the fuel control element which might further increase the output of the engine. The fuel control element therefore remains closed when the bracing lever on which the balance beam is supported is moved to this end position. If the brake pedal is further depressed, the piston of the hydraulic brake will then also be depressed so as to start the application of the wheel brakes. This further movement of the brake pedal for carrying out its conventional function does not interfere with mentioned bracing lever which is then stopped in its end position because of the provision of the one-way coupling between the brake pedal and this bracing lever which takes up the further movement of the connecting rod between the brake pedal and this coupling. This control mechanism also permits the engine brake and the wheel brake to be applied either separately or together. Of course, also in this case it is possible to employ the engine brake selectively in association with an exhaust brake.

The numerous features and advantages of the present invention will become more clearly apparent from the following detailed description thereof which is to be read with reference to the accompanying drawings, in which:

FIGURE 1 shows a diagrammatic illustration of the control mechanism according to the invention together with an engine, an infinitely variable transmission, and the power control lever in the neutral position;

FIGURE 2 shows a part of the same mechanism, but with the power control lever in the braking position;

FIGURES 3 and 4 show the same general arrangement of the elements of the control mechanism as illustrated in FIGURES 1 and 2, respectively, but with a cam plate in place of a bell crank.

FIGURE 6 shows the control mechanism according to FIGURE 5 in the braking position; while

Figure 5:
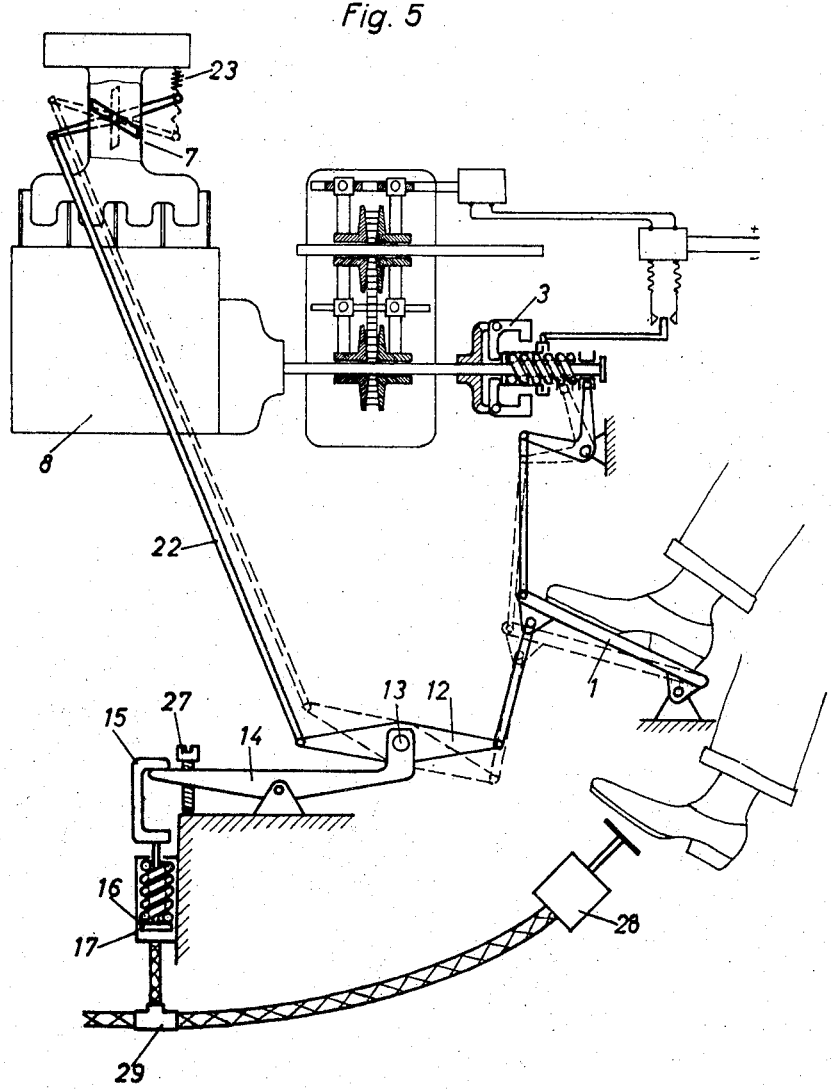
FIGURE 5 shows a diagrammatic illustration of a modification of the control mechanism according to the invention in the neutral position together with an engine, an infinitely variable transmission, and a brake pedal, and with the power control lever acting upon a balance beam.

According to the first embodiment of the invention, as illustrated in FIGURES 1 and 2, the power control pedal 1 or accelerator of a motor vehicle which is shown in FIGURE 1 in its neutral position, as indicated by the dot-and-dash line O—O, is connected by means of a bell crank 2 and a transmitting lever 10 to a centrifugal governor 3 for adjusting it to different operating positions. The governor 3, in turn, is adapted to vary the speed ratio of an infinitely variable transmission 4 by means of a reversing switch 31, a contactor 32, and a control motor 33. The power control pedal 1 is further connected to the throttle valve 7 of an engine 8 by means of a connecting rod 5 and a one-way coupling consisting of a spring 24 and a spring washer 25 on the end of rod 5 which are slidable within a housing 6 which is connected to one arm of a bell crank 37, the other arm of which is connected by another rod 22 to the throttle valve 7. The neutral position of pedal 1 is determined by a stop 30 against which the bell crank 37 is normally pressed by the action of a spring 23 which also tends to maintain the throttle valve in its closed position. When pedal 1 is pivoted forwardly, this movement is transmitted by the bell crank 2 and the transmitting lever 10 to the centrifugal governor 3 so that the balanced speed of the latter is increased and the governor, in turn, for example, by electrical means, such as the reversing switch 31, the contactor 32, and the control motor 33, changes the speed ratio of the infinitely variable transmission 4 so that the driven shaft of the latter will run at a lower speed and with a high torque. By the same forward movement of pedal 1, the spring washer 25 on the end of the connecting rod 5 acts upon the bottom of housing 6 which thereby pivots the bell crank 37 in the clockwise direction, whereby rod 22 acts upon the throttle valve 7 and opens the same so that, due to the increased supply of fuel to the engine 8, the output of the engine will be increased. When the power control pedal 1 is again pivoted back toward its neutral position, the reverse procedure takes place: the balanced speed of the governor 3 is reduced so that the speed ratio of the transmission is again changed, while at the same time the throttle valve 7 is again closed. When the power control pedal 1 is pivoted back beyond its neutral position, as shown in FIGURE 2, the balanced speed of the centrifugal governor is again increased by the pivoting movements of the bell crank 2 and the transmitting lever 10, and the speed ratio of the transmission 4 is thereby changed accordingly. The reverse movement of the connecting rod 5 is then taken up by the spring 24 which is thereby compressed by the spring washer 24 within the housing 6. The movement of the power control pedal 1 toward the rear of its neutral position O—O therefore only results in an adjustment of the centrifugal governor 3 and thereby in a smooth and gradual increase of the braking power of the engine in accordance with the increase in speed of the latter. By the movement of pedal 1 toward the rear of its neutral position it is possible by means of the bell crank 2 and the intermediate lever 10 to adjust the centrifugal governor 3 to the same extent as it may be done during the forward movement of the pedal, that is, during the period in which the vehicle is driven by the engine, although during this entire reverse movement of the pedal the connecting rod 22 remains in a locked position by the stop 30 so that the throttle valve 7 remains closed. By providing a suitable arresting device 11 (FIGURE 3), it is possible to arrest the power control pedal 1 in any desired braking position to which it has been moved. The driver may therefore safely remove his foot from this pedal without thereby affecting the continued braking action of the engine, and if necessary he may then use this foot to step on the normal brake pedal so as to apply the wheel brakes.

FIGURE 3 shows the control mechanism according to the invention again in its neutral position. This mechanism is of the same construction as that in FIGURE 1, except that in place of the bell crank 2 a cam plate 9 is employed upon which the transmitting lever 10 engages by means of a roller 26. This drawing also indicates in dotted lines the farthest forward position to which the power control pedal 1 may be pivoted when the vehicle is driven by the engine.

FIGURE 4 shows the mechanism according to FIGURE 3, but in the farthest braking position in which the power control pedal 1 is pivoted back as far as possible and the centrifugal governor 3 is adjusted by the cam plate 9 and the transmitting lever 10 so as to run at its highest balanced speed, while the throttle valve 7 is in its closed position, as indicated in FIGURE 1.

Figure 6:
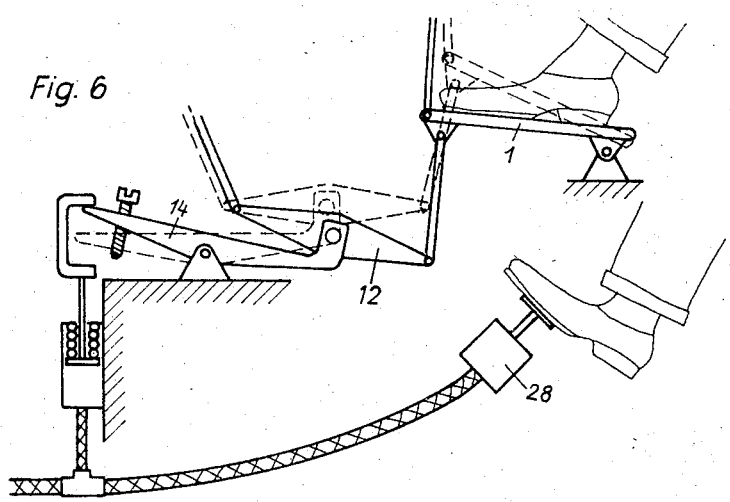

FIGURE 5 illustrates a modification of the control mechanism according to the invention which is preferably employed for the operation of a vehicle, the engine of which is equipped with an automatic clutch. The movement of the power control pedal 1, which in this case extends only in the forward direction from its neutral position, is transmitted to the fuel control element 7 by means of a balance beam 12 which is pivotably mounted on a pin 13 on one end of an intermediate lever 14. The other end of this lever 14 acts upon a clamp-shaped member 15 which is connected to a piston 16 which is movable longitudinally within a hydraulic cylinder 17. The neutral position of the control mechanism may be adjusted by means of a setscrew 27 on the intermediate lever 14. When the power control pedal 1 is actuated, the usual result occurs that the throttle valve 7 is opened and the balanced speed of the centrifugal governor 3 is also increased. However, when the brake pedal of a hydraulic brake mechanism 28 is then also actuated, the pressure is transmitted through a T-shaped connecting piece 29 to the hydraulic cylinder 17 in which the piston 16 is thereby lifted so that the intermediate lever 14 is deprived at one side of its support. When the power control pedal 1 is then depressed, as illustrated in FIGURE 6, the fuel control element 7 will no longer be actuated, but only the balanced speed of the centrifugal governor 3 will be varied. If the brake pedal of the hydraulic brake mechanism 28 is further depressed, the wheel brakes of the vehicle will be actuated in the usual manner. If the driver of the vehicle should step hard on both foot pedals at the same time, that is, on the power control pedal 1 and the pedal of the hydraulic brake mechanism 28, which ordinarily he might do only under the influence of shock, no dangerous results will occur since the fuel control element 7 is closed and the driving force of the engine is reduced to the idling power. On the contrary, the brake action of the hydraulic wheel brakes which is then normally to be expected will be increased by the additional braking force of the engine 8.

Figure 7:
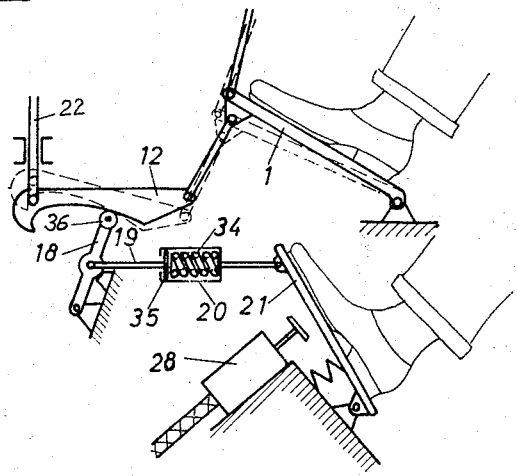
FIGURES 7 and 8 show diagrammatic illustrations of a further modification of the control mechanism in the neutral position and the braking position, respectively.
Figure 8:
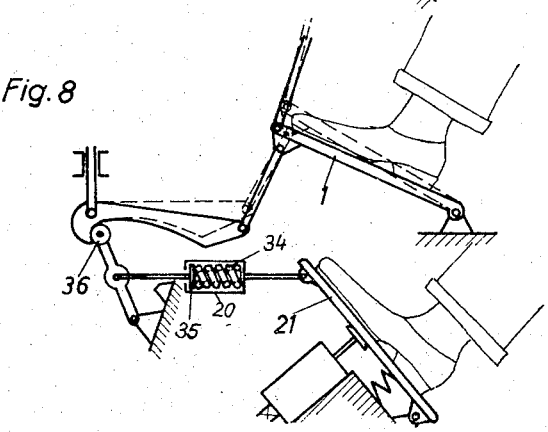

FIGURE 7 illustrates substantially the same control mechanism as shown in FIGURES 5 and 6, except that in this case the balance beam 12 is provided on its lower side with a cam surface and is normally centrally supported on a roller 36 which is mounted on a bracing lever 18. In normal driving, the operation of the power control pedal 1 will therefore open or close the throttle valve 7 and also actuate the centrifugal governor 3. If, however, the brake pedal 21 is also initially depressed, the bracing lever 8 will be pivoted forwardly toward its end position so that, even though the power control pedal 1 remains in the same position, the throttle valve 7 will be more or less closed. When the brake pedal 21 is so far depressed that the bracing lever 18 is in its most forward position, as shown in FIGURE 8, in which its roller 36 engages against a stop, the throttle valve 7 can no longer be actuated even though the power control pedal 1 is fully depressed. The throttle valve 7 therefore remains closed, while the speed of the centrifugal governor 3 is increased to its maximum value. In order to permit the brake pedal 21 to be further depressed so as to apply the wheel brakes of the vehicle, a one-way coupling 20, 34, 35 similar to that as described with reference to FIGURES 1 to 4 is interposed in the connecting rod 19 between the brake pedal 21 and the bracing lever 18.

Although our invention has been illustrated and described with reference to the preferred embodiments thereof, we wish to have it understood that it is in no way limited to the details of such embodiments but is capable Having thus fully disclosed our invention, what we claim is:

1. In combination with a drive unit of a vehicle comprising an engine, an infinitely variable transmission connected to said engine for driving, decelerating, and braking said vehicle, a fuel control element, and a governor influenced by the speed of said engine for controlling and varying the speed ratio of said transmission, a control mechanism for said drive unit comprising a single driver-actuated control member movable from a neutral position in two different and opposite directions, one of said directions forming a driving range within which said engine drives said vehicle, while the other direction forms a braking range within which said engine is driven by and exerts a braking action upon said vehicle, means connecting said control member to said governor for adjusting the same during the movement of said control member in both directions from said neutral position, means also connecting said control member to said fuel control element for opening and substantially closing the same during the movement of said control member within said driving range and for maintaining said fuel control element substantially in the closed position during the movement of said control member within said braking range while said engine is driven by said vehicle and said control member acts solely upon said governor.

2. In the combination as defined in claim 1, in which said means for connecting said control member to said governor comprise a bell crank.

3. In the combination as defined in claim 1, in which said means for connecting said control member to said governor comprise a cam plate and a transmitting lever engaging at one end with said cam plate and connected at the other end to said governor.

4. In the combination as defined in claim 1, further comprising means for arresting said control member in any position within said braking range to which it is moved by the driver.

5. In the combination as claimed in claim 1, means urging said fuel control element to closed position, the means connecting the control member to the fuel control element including a lost motion connection for permitting the control member to move within the braking range while the fuel control element remains in closed position.

6. In the combination as claimed in claim 1, said means connecting the control member to the governor including means to adjust the speed of the engine upwards as the control member moves away from the neutral position through the braking range.

References Cited

UNITED STATES PATENTS

| | | | |
|---|---|---|---|
| 2,131,157 | 9/1938 | Almen et al. | 74—472.2 |
| 2,640,372 | 6/1953 | Dodge | 192—4 |
| 2,754,691 | 7/1956 | May | 74—372 |
| 2,927,475 | 3/1960 | Burckhardt | 74—472.3 |
| 3,036,476 | 5/1962 | Klepper | 74—472 |
| 3,269,207 | 8/1966 | Borsattino | 74—472 |

FOREIGN PATENTS

| | | |
|---|---|---|
| 1,124,375 | 3/1956 | Germany. |
| 1,164,844 | 8/1958 | Germany. |
| 361,485 | 5/1962 | Switzerland. |

ROBERT M. WALKER, *Primary Examiner.*

DAVID J. WILLIAMOWSKY, DONLEY J. STOCKING, *Examiners.*

H. S. LAYTON, *Assistant Examiner.*